June 24, 1941.  T. R. HARRISON  2,246,679
MEASURING INSTRUMENT
Filed May 20, 1936 3 Sheets-Sheet 1
FIG. 1.
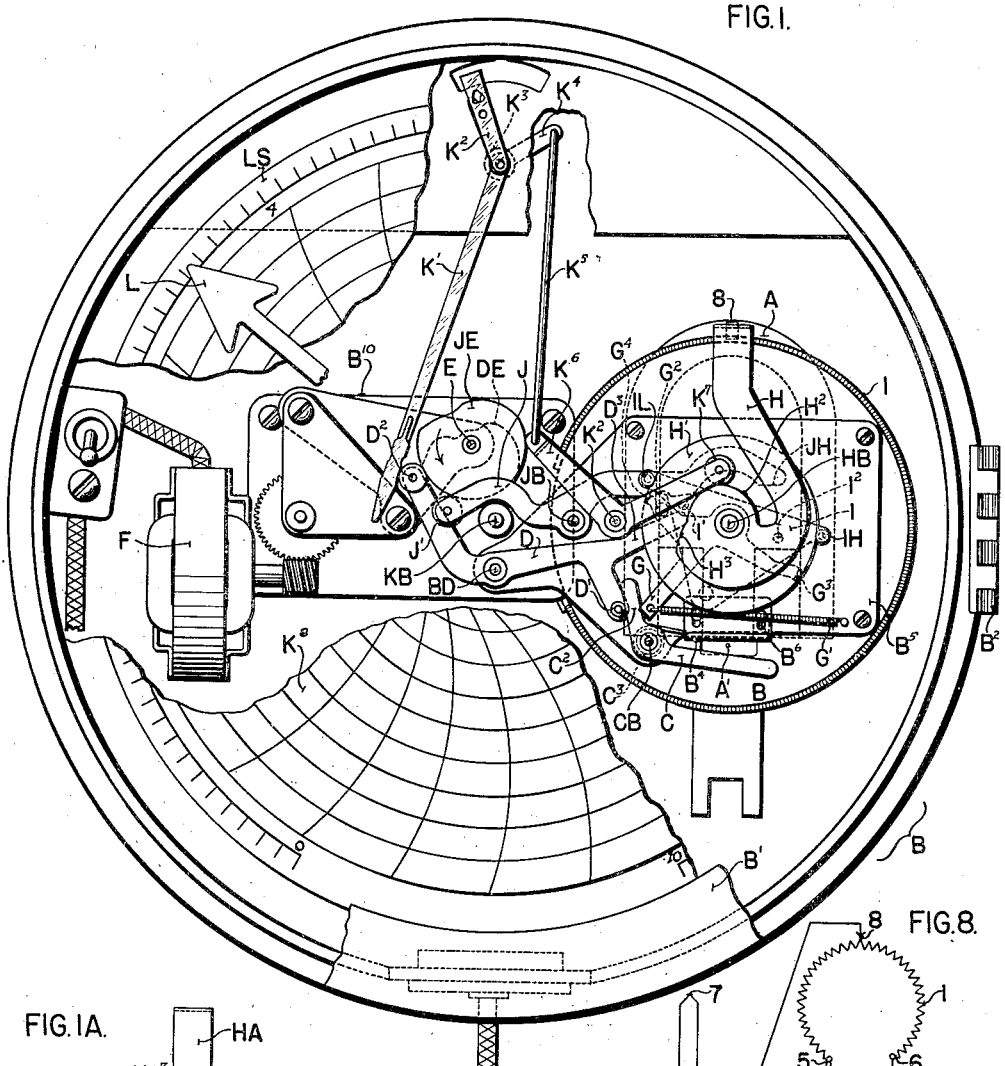
FIG. 1A.
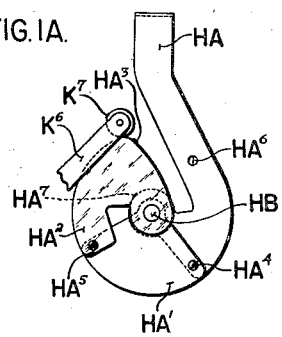
FIG. 8.
INVENTOR.
THOMAS R. HARRISON
BY George M. Muchamp
ATTORNEY June 24, 1941.　　　T. R. HARRISON　　　2,246,679
MEASURING INSTRUMENT
Filed May 20, 1936　　　3 Sheets-Sheet 2

INVENTOR.
THOMAS R. HARRISON
BY
ATTORNEY

June 24, 1941.　　　T. R. HARRISON　　　2,246,679
MEASURING INSTRUMENT
Filed May 20, 1936　　　3 Sheets-Sheet 3
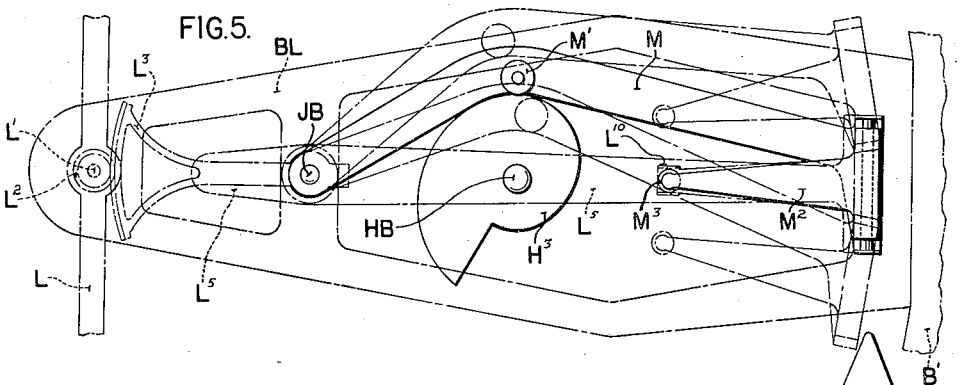
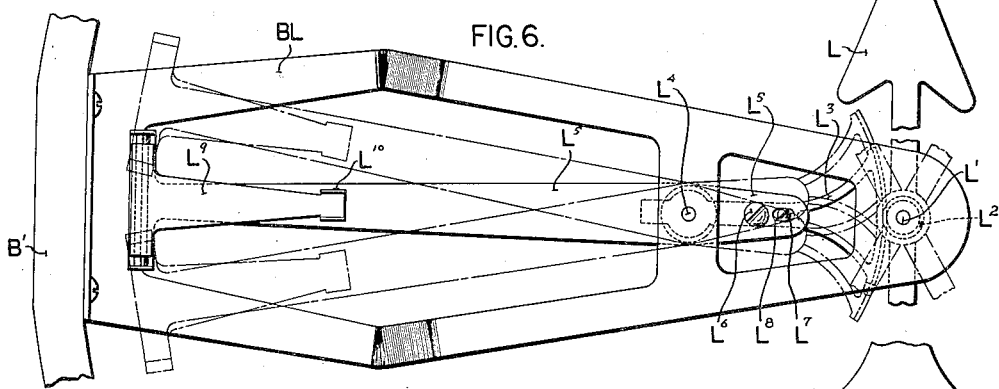
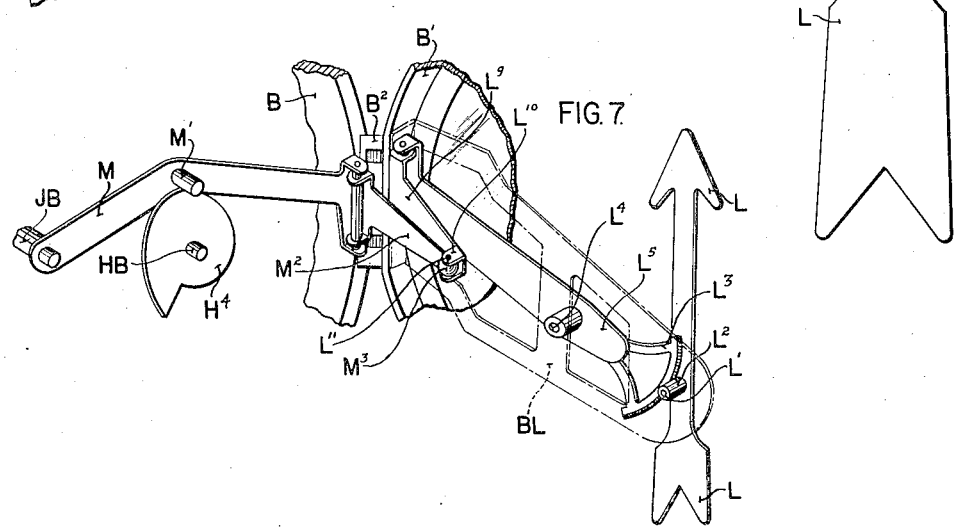
INVENTOR.
THOMAS R. HARRISON
BY
ATTORNEY Patented June 24, 1941

2,246,679

UNITED STATES PATENT OFFICE 2,246,679

MEASURING INSTRUMENT

Thomas R. Harrison, Wyncote, Pa., assignor to The Brown Instrument Company, Philadelphia, Pa., a corporation of Pennsylvania Application May 20, 1936, Serial No. 80,708

4 Claims. (Cl. 171—95)

My present invention relates to measuring instruments, and particularly to measuring instruments of the self-balancing potentiometric type, including exhibiting means which may be either indicating or recording or both indicating and recording means, for exhibiting the varying values of a measurable potential difference, such as the voltage of a thermocouple responsive to a variable temperature. In lieu of, or more usually, in addition to its exhibiting means, such an instrument may include control provisions.

The general object of the present invention is to provide an instrument of the above mentioned type, which is desirably simple in construction and reliable in operation, and which includes improved means for automatically rebalancing the potentiometer circuit, and improved means for exhibiting the varying value of the quantity measured on a desirable scale.

The improvements constituting the present invention were especially devised for use in recording instruments of the circular chart type, though some of the features of the present invention are not restricted to such use.

The various features of novelty which characterize my invention are pointed out with particularity in the claims annexed to, and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig 1 is a front elevation of an indicating and recording instrument, with parts broken away and in section;

Fig. 1A is an elevation illustrating a modification in a portion of the instrument shown in Fig. 1;

Figure 2:
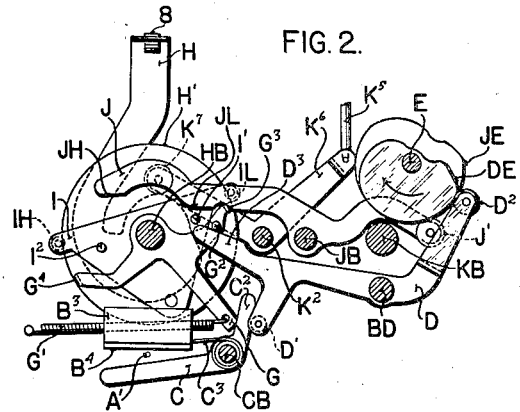
Figure 3:
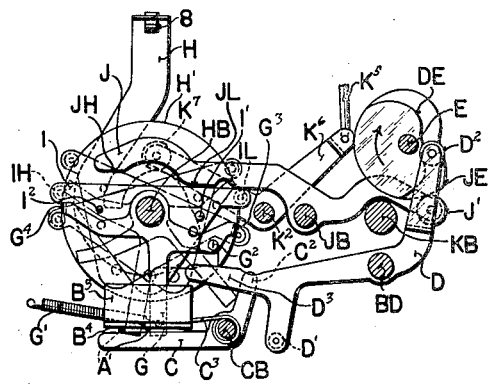
Figure 4:
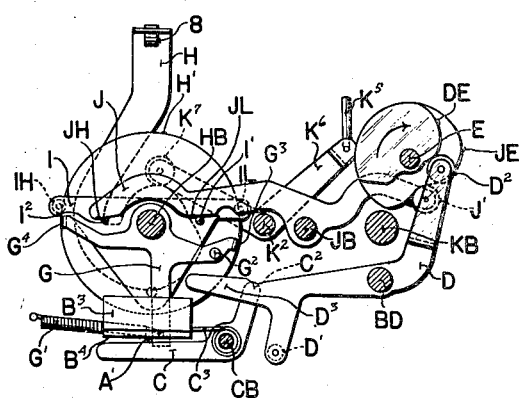

Figs. 2, 3, and 4 are sectional elevations showing different relative positions of certain parts of the apparatus shown in Fig. 1;

Fig. 5 is an elevation, as seen from the front of the instrument, of parts of the instrument of Fig. 1 different from those shown in Figs. 2–4;

Fig. 6 is an elevation of parts as seen from the inner side of the instrument casing door, which are carried by said door and cooperating with parts shown in Fig. 5;

Fig. 7 is a perspective view of parts shown in Figs. 5 and 6 with the casing door in its open position; and Fig. 8 is a diagram of one form of potentiometer circuit for the instrument shown in Fig. 1.

The potentiometer circuit shown in Fig. 8 comprises a slide wire resistance 1 and other resistances 2 and 3, and a circuit energizing dry cell or other source of constant potential 4, for maintaining a predetermined potential drop between the terminals 5 and 6 of the slide wire resistance 1. A galvanometer A has one terminal connected to the terminal 5, and has its second terminal connected to one terminal of a thermocouple 7. The other terminal of the thermocouple is connected to a contact 8 in sliding engagement with the slide wire resistance 1, and the position of which along the length of the resistance 1, is varied by the angular adjustment of an element H, which carries the contact 8 and is mounted for angular adjustment on a shaft HB about which the slide wire 1 is circularly curved. By suitable angular adjustments of the element H, the contact 8 may be so positioned that the drop of potential through the portion of slide wire resistance between the terminal 5 and the contact 8, is exactly equal and opposite to the electromotive force of the thermocouple 7, in which case the galvanometer pointer A' will occupy its neutral or zero position. Since the voltage drop through the portion of the slide wire resistance between the point 5 and contact 8 is proportional to the length of that portion, when the pointer A' is in its neutral position, the angular position of the member H is a measure of the thermocouple voltage.

The instrument shown in Fig. 1 includes parts corresponding to all those shown diagrammatically in Fig. 8, except the thermocouple and the circuit connections thereto, and includes, in addition, mechanical relay provisions, controlled by the deflection of the galvanometer pointer A', for periodically adjusting the contact 8 as required to rebalance the measuring circuit, when the latter is unbalanced as a result of a variation in the thermocouple voltage, and also includes provisions controlled and actuated by the angular position of the element H for indicating and recording the varying values of the thermocouple voltage. In respect to its general operating characteristics just mentioned, the instrument shown in Fig. 1 does not differ from prior self-balancing potentiometer instruments, but in respect to the form and character both of its rebalancing and its indicating and recording provisions, the instrument shown in the drawings differs from, and comprises improvements over previously known potentiometer instruments.

In the instrument shown in the drawings, all of the instrument parts are normally contained within an instrument casing comprising a cylindrical body B with a closer rear end and an open front end, and a front cover or door B' connected to the body B at one side of the casing by a hinge B². Most of the instrument parts are supported by the casing body, but some of the indicating parts are mounted on the casing door B', and are moved away from the other instrument parts when the casing door is turned into its open position, as is shown in Fig. 7.

Preparatory to a more detailed description of the mechanism, it is noted that the instrument illustrated includes means for periodically clamping the galvanometer pointer A' in whatever deflective position it may then occupy, and for moving a feeler or gauging member G into a position of engagement with the clamped pointer A' which is selectively dependent on the deflective position of the latter, and for adjusting a clutch device I into an operative position relative to the element H, dependent upon the selective position of the feeler member G when in engagement with the clamped pointer A', and for then angularly adjusting the element H through the clutch device I to an extent and in a direction selectively dependent upon the position into which the device I has been adjusted by the feeler G. The element H includes cam surfaces H³ and H² through which the angular movements of the element give suitable corresponding movements to levers K⁶ and L⁶ through which a pen arm K¹ and an indicating pointer L are suitably adjusted to record and indicate the existing value of the thermocouple voltage. A continuously operating relay motor F rotates a cam shaft E parallel to, but laterally displaced from the shaft HB, to thereby effect cyclic operations, relatively timed as hereinafter described, of the pointer clamping mechanism, the feeler G, device I, and through the latter the element H.

In the instrument shown, the galvanometer A is mounted adjacent the rear end wall of the casing body B, and the galvanometer pointer A' projects forwardly from that wall. The pointer clamping means provided, comprises a stationary abutment member B³ and a lever C. The abutment surface edge B⁴ of the member B³ is slightly above the normal plane of deflection of the pointer A', and the lever C is journalled on a supporting pivot or shaft CB and has an arm normally below said plane. The lever C is periodically turned counter-clockwise to engage the pointer A' and move its said arm into engagement with, and thereby clamp it against the abutment surface B⁴. As shown, the abutment member B³ is adjustably secured to a plate-like instrument supporting frame member B⁵ by screws passing through slots B⁶ in the member B³ extending transversely to its surface B⁴. The frame member B⁵ is mounted on, and supported by the rear wall of the casing body B, and supports the previously mentioned supporting shaft or pivot HB for the element H, and the pivot shaft CB on which the lever C is journalled, and also carries other supporting shafts hereinafter mentioned, which like the shafts HB and CB, extend transversely to said rear wall.

The clamping lever C is biased for turning movement in the counter-clockwise or clamping direction by a spring C³, but is normally held out of its clamping position by a lever D which is journalled on a supporting shaft BD. The latter is carried by the frame member B⁵, and carries an anti-friction roller D' normally engaging the arm C² of the lever C, to thereby hold the latter out of its pointer clamping position. The lever D is periodically permitted to turn clockwise about its supporting shaft BD to permit the lever C to engage the pointer A' and clamp the latter against the abutment edge B⁴ by the edge DE of a cam carried by the cam shaft E, the edge DE being engaged by a roller D² carried by the lever D.

The cam shaft E forms part of a power unit including the motor F. The latter constantly rotates the cam shaft E through suitable speed reducing gearing which need not be illustrated or described in detail, as it includes nothing claimed as novel herein. As shown, the power unit includes a supporting frame member B¹⁰ mounted on, and supported from the rear wall of the casing body, and on which the motor F and cam shaft E are mounted, as is the gearing through which the motor revolves the shaft E.

The feeler or gauge member G which engages the pointer A' when the latter is clamped, and by its position when in engagement with the pointer, determines the operative adjustment of the clutch device I then effected, is journalled on the shaft HB, and is biased for counter-clockwise movement into engagement with the pointer A' by a spring G'. Except during the periods in which the pointer is clamped, the member G is held out of the range of deflection of the pointer by a portion D³ of the lever D, which then engages a pin or projection G² carried by the feeler G.

The element H which supports and adjusts the contact 8, and is journalled on the shaft HB, includes a disc H' which is coaxial with the shaft HB, and cooperates with the clutch device I to form the clutch mechanism through which the element H is given its angular adjustments. The device I comprises a plate-like body portion alongside the disc H' and formed with an opening receiving the shaft HB loosely, so that the device is permitted a limited movement transverse to the shaft. The clutch device I is normally supported by the disc H' through pins IL and IH projecting transversely away from the body portion of the device I and normally engaging and resting on the edge of the disc H'. The disc engaging surfaces of the pins IL and IH are separated by a distance slightly less than the diameter of the disc H, and in the hereinafter mentioned neutral position of the device I, shown in Fig. 4, the two pins lie in a horizontal plane which is above the axis of the disc H'.

With both pins bearing against the edge of the disc H', a downwardly acting force applied to the device I adjacent the pin IL, will operatively couple the clutch device to the disc H' and rotate the latter clockwise as seen in Figs. 2, 3, and 4, and similarly a downwardly acting force applied to the device I adjacent its pin IH, will operatively couple the device I to the disc H' and rotate the latter counter-clockwise as seen in Figs. 2, 3, and 4. Such disc rotating forces are applied to the clutch device I, as hereinafter described, through pins I' and I² carried by the body member I and respectively adjacent the pins IL and IH. Conversely, an upwardly acting force applied to the member I adjacent the pin IL, and tending to lift the latter out of engagement with the disc H', will adjust the device I counter-clockwise, and an upwardly acting force applied to the device I adjacent the pin IH, will adjust the device I in the clockwise direction, as seen in Figs. 2, 3, and 4. The last mentioned adjustments of the device I will not produce corresponding angular adjustments of the disc H', if the latter has some slight tendency to remain in any position into which it is adjusted, such as it has in the arrangement shown, as a result of the frictional engagement of the contact 8 with the slide wire resistance 1. Upwardly acting forces are periodically applied to the device I to adjust the latter relative to the disc H' in one direction or another, by the feeler or gauging member G.

As, following each rebalancing operation, the lever D turns the feeler element G into its normal inoperative position shown in Fig. 2, the clutch device I is turned into its inoperative position, also shown in Fig. 2, by a lateral feeler projection $G^3$ acting upwardly on a portion of the spanner adjacent the pin IL. That adjustment of the device I does not result in a corresponding adjustment of the disc H'. As the member G thereafter turns from its inoperative position shown in Fig. 2, toward or through its full line position shown in Fig. 3, a projection $G^4$ from the feeler G applies an upwardly acting force to a portion of the device I adjacent the pin IH, and turns the device clockwise, as seen in Figs. 2, 3, and 4, to an extent dependent on the extent of feeler movement required to bring the feeler G into engagement with the pointer A' which is then clamped between $B^4$ and C. The last mentioned adjustment of the device I does not give movement to the disc H', but does determine the direction and extent of movement imparted to the disc H', when the device is thereafter moved, as hereinafter described, by the actuating lever J.

The actuating lever J is journalled on a supporting shaft JB carried by the frame member $B^5$, and carries a roller J' which bears against the edge JE of a cam carried by the cam shaft E so that the rotation of the latter oscillates the lever J on its shaft JB. The lever J has engaging surfaces JL and JH at opposite sides of the shaft HB, and adapted to engage and apply downwardly acting forces to the previously mentioned lateral projections or pins I' and $I^2$, respectively, of the clutch device member I. At the conclusion of each rebalancing operation, both pins I' and $I^2$ are engaged by the lever surfaces JL and JH, respectively, as shown in Fig. 4, so that the device I is then held in its neutral position as shown in Fig. 4.

As the lever J moves into the position shown in Fig. 4, it may give turning movements in either direction to the device I and element H, or may not alter the previously assumed angular positions of the device I and element H, depending on the immediately preceding action of the feeler G on the device I. If that action has raised the pin $I^2$ relative to the pin I', as is the case if the pointer A', when engaged by the feeler G, is at the left of the neutral position shown in dotted lines in Fig. 3, the following movement of the lever J into the position shown in Fig. 4, turns the device I and element H counter-clockwise. On the other hand, if the preceding adjustment of the device I has resulted from the engagement of the feeler G with the pointer A' when the latter is clamped in its position at the right of neutral shown in Fig. 2, thereby raising the pin I' above the pin $I^2$, the movement of the lever J into the position shown in Fig. 4 results in a clockwise adjustment of the device I and element H. If, however, the pointer, when clamped and engaged by the feeler, is in its neutral position as shown in full lines in Fig. 3, the feeler then adjusts the device I into its neutral position, and the angular positions of the device I and element H are not changed by the following movement of the lever H into the position shown in Fig. 4.

As will be apparent, the actuation of the device I and element H by the lever J is not only selectively dependent in direction upon the direction of displacement of the clamped pointer A' from its neutral position, but is selectively dependent in magnitude upon the extent of displacement of the clamped pointer A' from the neutral position of the latter.

The recording provisions of the instrument shown in the drawings, comprise a circular chart $K^8$ at the front of the instrument carried by a chart driving member KB mounted in the frame member $B^{10}$ and forming a part of the power unit which is slowly rotated by the motor F, and a pen arm K' in front of the chart. The arm K' is carried in a well known manner through a yoke $K^2$ by an oscillating member $K^3$ back of the chart and having an operating arm $K^4$ connected by a link $K^5$ to a lever $K^6$ carrying a roller $K^7$ engaging a suitably shaped cam edge portion $H^2$ of the element H. As the angular position of the element H is varied, in accordance with changes in the thermocouple voltage or other quantity measured, the edge cam $H^2$ correspondingly turns the lever $K^6$ and the pen arm K', so that the latter records the value of the quantity measured on the chart $K^8$.

In many cases, it is desirable that an instrument of the character disclosed should give a visual indication of the value of the quantity measured, which is more easily read than the indication furnished by the angular position of the pen arm K'. For instance, if the instrument is used to measure some temperature or other condition of boiler operation, it is ordinarily desirable that the instrument should furnish an indication of the current value of the quantity measured which can be visually observed from various points or stations in the boiler room. To provide such an indication, the instrument shown comprises a pointer L, actuated through suitable means by the element H to indicate the value of the quantity measured, on a circular scale LS carried by the instrument adjacent the periphery of the chart K.

The means shown, through which the pointer L is moved, comprises a lever M, which is back of the chart $K^8$, and is conveniently pivoted, as shown, on the shaft JB, and carries a pin M' engaging a cam part of the element H. As will be apparent, the cam part engaged by the pin M', may be the edge cam $H^2$ through which the pen arm K' is moved, but, to permit the use of different scale arrangements, as hereinafter described, the lever M may well be given its movements by a separate cam $H^4$, as shown in Fig. 5.

The pointer L is in front of the chart $K^8$, and in accordance with the present invention, is preferably mounted on the casing door for movement away from the chart when the door is opened, so as not to interfere with the replacement or adjustment of the chart. As shown, the pointer L is journalled on a supporting stud or shaft L' carried by a bracket BL rigidly attached to the rim or frame of the casing door B' adjacent the hinge connection $B^2$ for the latter. When the scale LS extends circularly about the axis of the chart driving member KB, as shown, the pivot L' may well be mounted in the bracket BL, so as to be coaxial, or substantially so, with the member KB when the door B' is in its closed position. Rigidly secured to the pointer L is a pinion $L^2$ in mesh with a gear segment $L^3$ secured to the adjacent end of a lever $L^5$ pivoted on the bracket BL at $L^4$ by eccentric adjusting and clamping means including screws $L^6$ and $L^7$ and a slot $L^8$ in the arm $L^5$. The pivot $L^4$ is coaxial with the shaft JB when the casing door B' is in its closed position. As the lever $L^5$ is rotated between its two dotted line positions shown in Fig. 6, the indicating end of the pointer L is moved along the scale LS from one end to the other of the latter.

The end of the lever $L^5$ remote from the pinion $L^2$, and the end of the lever M remote from its supporting shaft JB, extend into proximity with the hinge connection $B^2$, and are connected by a flexible connection, which extends past the edge of the chart $K^8$ and through which angular movements of the lever M about the supporting shaft JB, give corresponding angular movements to the lever $L^5$ when the door B' is in its closed position, and which accommodates the relative movements of the two levers occurring when the door B' is moved between its closed and open positions.

In the form shown, the said flexible connection comprises an arm $L^9$ pivotally connected to the lever $L^5$, an arm $M^2$ pivotally connected to lever M, and a universal joint connection between the two arms, the axis of the pivotal connection between each arm and the lever to which it is connected substantially transverse to the length of the lever. The universal joint, in the form shown, comprises a ball $M^3$ rigidly connected to the free end of the arm $M^2$ and held between transverse projections $L^{10}$ from the arm $L^9$ at its free end, which are formed with small apertures $L^{11}$ to receive diametrically opposed portions of the ball $M^3$.

The means described for giving their respective movements to the pen arm K' and indicator arm L, are simple and effective from the mechanical standpoint, and the manner in which the indicator pointer L is mounted and actuated, is especially desirable because it permits of a pointer length as great as the chart diameter, without interfering with chart adjustments or replacements.

Furthermore, the means through which the pen arm K' and the pointer L are given their movements, make it readily feasible to give to the movements of each, the particular scale values most desirable from the practical standpoint for any given use of the instrument. The contour of the cam edge $H^2$ shown in Fig. 1, is such as to progressively move the pen arm K' outwardly from the center to the periphery of the chart $K^8$ as the value of the quantity measured increases and the contact 8 is correspondingly adjusted in the counter-clockwise direction. If the movement of the pen from its initial central position on the chart to the periphery of the latter, corresponds to the movement of the contact 8, as the value of the quantity measured increases from zero to its maximum value, the record produced is what is sometimes referred to as a full scale record.

In some cases, however, what is known as a "suppressed scale" record is practically desirable, and is obtainable with a simple modification of the apparatus shown in Fig. 1. For example, if the part of the element H carrying the cam edge $H^2$ shown in Fig. 1, is replaced by a part HA and cam parts HA' and $HA^2$ detachably connected thereto, as shown in Fig. 1A, a suppressed scale record will be produced as a result of the contour of the cam edge collectively formed by the parts HA, HA', and $HA^2$, and engaging the pen arm actuating lever roller $K^7$. As is plainly apparent in Fig. 1A, all portions of the edge engaged by the pen actuating lever roller $K^7$ collectively formed by the parts HA, HA' and $HA^2$, are parts of a circular arc concentric with the shaft HB, except the edge portion $HA^3$ of the part $HA^2$. The edge portion $HA^3$ is shaped and disposed to move the pen arm from the central portion of the chart to its periphery, as the value of the quantity measured increases from zero to a certain predetermined value much smaller than the value of the quantity corresponding to the full angular movement of the element H. As the quantity increases in value above said predetermined value, the position of the pen arm, then at the periphery of the chart, will not change. The record thus produced is commonly referred to as a suppressed scale record.

Instead of suppressing the record except for values of the quantity measured between zero and said predetermined value, some other record portion or portions may be suppressed. For example, if with the apparatus shown in Fig. 1A the part HA' is removed, and the part $HA^2$ is adjusted counter-clockwise relative to the part HA, so that it may be secured to the latter by the screw $HA^4$ with the latter passing through the screw hole $HA^5$ in the part $HA^2$, the pen actuating lever roller $K^7$ will then move along the hub portion $HA^7$ of the part HA as the quantity measured increases from zero to a certain intermediate value, and if the hub portion is concentric with the shaft HB, the pen arm will be at its minimum value position on the chart for values below said intermediate value. As the value increases from said intermediate value to a second intermediate value, and the roller $K^7$ moves along the cam edge $HA^3$, the pen arm will move from its zero value position on the chart to the periphery of the latter, and thereafter, as the quantity measured continues to increase in value, the pen arm will remain at the periphery of the chart. With the arrangement just described, the record of the value of the quantity measured is suppressed, except for values between the two intermediate values mentioned.

If with the part HA' removed, the part $HA^2$ is secured with the screw hole $HA^5$ in register with the screw hole $HA^6$ of the part HA, only values of the quantity measured between its maximum value and a certain intermediate value, are recorded.

Which scale portion or portions of the record are advantageously suppressed in any given case, will depend upon conditions of use. The increased accuracy and ease of reading the record obtainable with the suppressed scale effect, are plainly apparent, since the effect of moving the pen entirely across the chart for a portion only of the full range of variation in value of the quantity measured, is to "open" the record formed or, stated different, is to increase the distance between two scale marks representing two successive scale units.

Instead of totally suppressing some portion or portions of the scale, it may be desirable in some cases to make the contour of the controlling cam such as to open up the scale for a certain and practically important fraction of the range of value variation and correspondingly closing but not entirely suppressing the scale of another portion or portions of the range of value variations. This result is secured with the cam edge $H^2$ shown in Fig. 1, which has its edge so shaped that a portion $H^3$ thereof, engaging the roller $K^7$ during the angular movement of the element H through a relatively small intermediate portion of its total range of movement, is adapted to give the pen arm a major portion of its movement between the central portion and periphery of the chart $K^8$. With the parts so arranged, the initial and final portions of the movement of the pen arm from the central portion to the periphery of the chart will actually record the corresponding variations in the value of the quantity measured, but will record those variations in accordance with a scale much closer or smaller than the scale of the record formed while the roller $K^7$ engages the cam edge portion $H^3$.

The suppressed scale effect is desirable in indicating, as well as in recording, values of the quantity measured. For example, if it be assumed that the instrument shown were intended to measure a furnace temperature varying from a minimum of zero to a maximum of 1200°, but which under all normal operating conditions varies only between a minimum of 800° and a maximum of 1000°, there would be an obvious advantage, in some cases, in shaping the cam $H^4$ so that the pointer L is moved from one end to the other of the scale LS, as the temperature varies between 800° and 1000°. In some cases, there would be an especial advantage in obtaining such a suppressed scale indication by the pointer L, while obtaining a full scale record by the use of a cam, such as the cam edge $H^2$, progressively advancing the pen arm from the central portion to the periphery of the chart as the value of the quantity measured varies from zero to its maximum value. Similarly, in some cases it may be desirable to obtain a full scale indication of the entire change in value of the quantity measured, while recording the varying values of the quantity through a portion only of its total range of variation.

Whether or not the suppressed scale effect is obtained, with the means for adjusting either the pen arm or the pointer L, the described means for giving the pen arm and pointer their movements as the element H is adjusted, are desirable because of their simplicity and effectiveness and because they permit of the ready use of cam contours making the deflections of either pen arm or pointer linearly proportional to the changes in value of the quantity measured, even though that value is not in linear proportion with the angular movement of the member H occurring as the measured quantity changes in value.

As will be apparent to those skilled in the art, all of the features of construction and arrangement hereinbefore described, contribute to the production of a circular chart potentiometer instrument characterized by its relative simplicity and compactness and by its relatively low inherent cost of produ- ion. From the standpoints of simplicity in construction and operation and compactness, the arrangement of the cam shaft E and the potentiometer rebalancing element H side by side, with their axes transverse to the record chart plane, is especially important, and additional advantages are obtained by mounting of the feeler G and clutch mechanism, including the device I, coaxially with the element H, and so that all operations involved in the periodic angular adjustments of the element H may be effected by the single cam shaft E, and the two levers, D and J, oscillated by the cam shaft.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A potentiometric instrument including a galvanometer deflecting in accordance with potentiometer unbalance, a potentiometer rebalancing element angularly adjustable about an axis, a clutch device having portions at opposite sides of said axis and adapted to be operatively coupled to said element, and to turn the latter in one direction or the other, by pressure against one or the other said portions, a lever having its fulcrum laterally displaced from said axis, means adapted to periodically turn said lever about its fulcrum toward and away from a position in which said lever presses against both of said portions and thereby holds said device in a neutral position and on engagement with said device couples the latter to said element, and means adapted to periodically adjust said device relatively to said element angularly about said axis from said neutral position into a position dependent on the deflection of said pointer, whereby said lever on its subsequent movement into the position first mentioned will first engage one or the other of said portions, depending on the adjustment of said device, and thereby couple said device to said element and turn said device in one direction or the other, back into said neutral position.

2. The combination in a self balancing potentiometer instrument, of a slide wire resistance curved about an axis, means responsive to potentiometer unbalance, potentiometer rebalancing means controlled by the first mentioned means and including an element including a cam part angularly adjustable about said axis, a contact carried by said element and moved along said resistance as said element is angularly adjusted, and exhibiting mechanism including an actuating lever pivoted at a distance from said axis and including a portion engaged and actuated by said cam part.

3. The combination in a self-balancing potentiometer instrument, of a stationary disc, a slide-wire resistance curved about the periphery of said disc concentric with its axis, means responsive to potentiometer unbalance, potentiometer rebalancing means controlled by the first mentioned means and including a relay mechanism actuated in accordance with the response of said responsive means, an element acted upon by said relay mechanism including a cam part angularly adjustable about the axis of said disc, said element moved by said relay mechanism an amount proportional to the potentiometer unbalance, a contact carried by said element and moved along said resistance as said element is angularly adjusted, and exhibiting mechanism including an actuating lever pivoted at a distance from said axis and including a portion engaged and actuated by said cam part.

4. The combination in a self-balancing potentiometer instrument, a disc, a slidewire resistance curved about the axis of said disc, means responsive to potentiometer unbalance, potentiometer rebalancing means controlled by said first mentioned means including a relay mechanism, an element acted upon by said relay mechanism having a cam formed on the surface thereof and rotatable about said axis, means operated by said relay mechanism to rotate said element in a direction and an amount proportional to potentiometer unbalance, a contact carried by said element and moved along said resistance as said element is angularly adjusted, and exhibiting mechanism including an actuating lever pivoted at a distance from said axis and including a portion engaged and actuated by said cam part.

THOMAS R. HARRISON.